United States Patent
Nakata

(10) Patent No.: US 8,189,593 B2
(45) Date of Patent: May 29, 2012

(54) COMMUNICATION SYSTEM, COMMUNICATION NODE, AND PACKET SCHEDULING METHOD

(75) Inventor: Tsuneo Nakata, Tokyo (JP)

(73) Assignee: NEC Corporation, Tokyo (JP)

( * ) Notice: Subject to any disclaimer, the term of this patent is extended or adjusted under 35 U.S.C. 154(b) by 239 days.

(21) Appl. No.: 12/601,564

(22) PCT Filed: Jun. 6, 2008

(86) PCT No.: PCT/JP2008/060428
§ 371 (c)(1),
(2), (4) Date: Nov. 24, 2009

(87) PCT Pub. No.: WO2008/149970
PCT Pub. Date: Dec. 11, 2008

(65) Prior Publication Data
US 2010/0189112 A1    Jul. 29, 2010

(30) Foreign Application Priority Data
Jun. 6, 2007  (JP) .................................. 2007-149850

(51) Int. Cl.
*H04L 12/56* (2006.01)
(52) U.S. Cl. ...................................................... 370/394
(58) Field of Classification Search .......... 370/229–231, 370/235, 236, 241, 242, 248, 252, 351, 289, 370/392, 394, 400, 412, 428–429, 389
See application file for complete search history.

(56) References Cited

U.S. PATENT DOCUMENTS

| | | | |
|---|---|---|---|
| 2003/0002519 A1* | 1/2003 | Terry et al. | 370/445 |
| 2006/0256803 A1* | 11/2006 | Nakata et al. | 370/412 |
| 2010/0232294 A1* | 9/2010 | Samuels et al. | 370/235 |

FOREIGN PATENT DOCUMENTS

| | | |
|---|---|---|
| JP | 10-308774 A | 11/1998 |
| JP | 11-187031 A | 7/1999 |
| JP | 2000138684 A | 5/2000 |
| JP | 2002314584 A | 10/2002 |
| JP | 2005064854 A | 3/2005 |
| JP | 2006157889 A | 6/2006 |
| WO | 2005067227 A | 7/2005 |

OTHER PUBLICATIONS

T. Nakata et al., "Efficient bundling of heterogeneous radio resources for broadband Internet access from moving vehicles", in proceedings of Global Mobile Congress, Oct. 11-13, 2004.*

International Search Report for PCT/JP2008/060428 mailed Sep. 9, 2008.

(Continued)

*Primary Examiner* — Derrick Ferris
*Assistant Examiner* — Omar Ghowrwal

(57) ABSTRACT

Provided is a communication system in which a transmission path between communication nodes is multiplexed. A communication node transmitting packets decides the order of the packets to be transmitted through each transmission path on the assumption that an event that causes a state change to the transmission path occurs upon the start of the packet transmission, such that the packet reception order is not reversed at a communication node that receives the packets.

9 Claims, 7 Drawing Sheets

OTHER PUBLICATIONS

T. Nakata et al., "Efficient bundling of heterogeneous radio resources for broadband Internet access from moving vehicles", in proceedings of Global Mobile Congress 2004, Oct. 11-13, 2004, Shanghai, China.

J. Postel. "Transmission Control Protocol, Darpa Internet Program Protocol Specification", RFC793, Sep. 1981, http://tools.ietf.org/html/rfc793, pp. 1-85.

T. Moriya et al., "A Study of Reordering Distributed Packets in Multilink Systems", Proceedings of the 2005 IEICE Communications Society Conference (No. 2), Sep. 7, 2005, p. 109, B-6-109.

N. Taniguchi et al., "A Study of Packet Distribution Method for Packet Order Maintenance in Cognitive Radio Network", IPSJ SIG Technical Report, vol. 2006, No. 50, May 18, 2006, p. 55-60, 2006-MBL-37(11).

* cited by examiner

COMMUNICATION SYSTEM, COMMUNICATION NODE, AND PACKET SCHEDULING METHOD

This application is the National Phase of PCT/JP2008/060428, filed Jun. 6, 2008, which is based upon and claims the benefit of priority from Japanese patent application No. 2007-149850, filed on Jun. 6, 2007, the disclosure of which is incorporated herein in its entirety by reference.

TECHNICAL FIELD

The present invention relates to a communication system in which a transmission path between communication nodes is multiplexed, a communication node, and a packet scheduling method used in the communication system.

BACKGROUND ART

Recently, a communication node (computer, hub, router, etc.) constituting a network such as an Internet or the like needs high speed data transmission due to the increase in the amount of data transmitted and received. An exemplary technique for achieving high speed data transmission is a method for multiplexing a transmission path connecting communication nodes.

When a transmission path between two communication nodes is multiplexed, since packets are transmitted from one communication node to the other communication node via a plurality of transmission paths having different bandwidths, the packet reception order is reversed at the other communication node. When a communication system, in which a transmission path is multiplexed, corrects the reversed packet reception order and transfers packets to a downstream communication node, delay of the packet transmission increases in the communication system due to the time needed for the correction.

A method for reducing delay when a transmission path is multiplexed has been described in, e.g., non-patent reference 1 (T. Nakata et al., "Efficient bundling of heterogeneous radio resources for broadband Internet access from moving vehicles" in proceedings of Global Mobile Congress 2004, Oct. 11-13, 2004, Shanghai, China). Non-patent reference 1 suggests a technique for monitoring states (bandwidth reduction, packet loss, etc.) of the respective multiplexed transmission paths, detecting a state change when it occurs in any transmission path, deciding the packet transmission order, and reflecting the packet transmission order in the packet scheduling.

The prior art of a communication system in which a transmission path is multiplexed will be described.

Meanwhile, hereinafter, for convenience of explanation, it is assumed that all packets are of the same size.

FIG. 1 is a schematic diagram illustrating an operation example of a communication system in which a transmission path is multiplexed according to the first prior art, and FIG. 2 is a schematic diagram illustrating an operation example when bandwidth reduction occurs in the transmission path of the communication system of FIG. 1.

The first prior art provides an example in which bandwidth reduction occurs in any one of the multiplexed transmission paths.

FIGS. 1 and 2 schematically show an operation example of transmission node 1-1 and reception node 1-2, when a packet group starting from sequence number 1 is transmitted from transmission node 1-1 to reception node 1-2 via transmission paths 2-1 and 2-2. The sequence number is given to each packet to express the packet transmission order. Transmission node 1-1 and reception node 1-2 shown in FIGS. 1 and 2 are communication nodes. A communication node that transmits packets is referred to as a 'transmission node' and a communication node that receives packets is referred to as a 'reception node'. From now on, the 'transmission node' indicates a communication node that transmits packets and the 'reception node' indicates a communication node that receives packets.

Here, it is assumed that transmission path 2-1 has a bandwidth twice as wide as that of transmission path 2-2 and that transmission node 1-1 and reception node 1-2 employ a widespread window control described in, e.g., non-patent reference 2 (Jon Postel, Editor, RFC793, http://tools.ietf.org/html/rfc793) and adopted to TCP as a flow control mechanism. In addition, transmission node 1-1 and reception node 1-2 will be explained on the assumption that, taking into consideration the bandwidth difference between transmission path 2-1 and 2-2 in units of packet size, transmission path 2-1 has a window size of 6 and transmission path 2-2 has a window size of 4. Moreover, in the following description, the unit of the window size is the packet size unless specially mentioned.

First of all, an explanation will be made on the operation of transmission node 1-1 and reception node 1-2 when bandwidth reduction does not occur in transmission path 2-1 and transmission path 2-2 shown in FIG. 1.

Transmission node 1-1 transmits packet stream 10-1 having the window size of transmission path 2-1 using transmission path 2-1 and transmits packet stream 10-2 having the window size of transmission path 2-2 using transmission path 2-2. That is, transmission node 1-1 transmits packet stream 10-1 composed of 6 packets using transmission path 2-1 and transmits packet stream 10-2 composed of 4 packets using transmission path 2-2. Here, whenever allocating 2 packets to packet stream 10-1, transmission node 1-1 allocates 1 packet to packet stream 10-2 taking into consideration the bandwidth difference between transmission path 2-1 and transmission path 2-2.

Transmission node 1-1 decides sequence numbers of the packets allocated to packet streams 10-1 and 10-2 to prevent the packet reception order from being reversed at reception node 1-2.

Reception node 1-2 receives packet stream 10-1 transmitted through transmission path 2-1 and packet stream 10-2 transmitted through transmission path 2-2, respectively. Here, the packet stream received at reception node 1-2 through transmission path 2-1 is referred to as packet stream 20-1 and the packet stream received at reception node 1-2 through transmission path 2-2 is referred to as packet stream 20-2.

When it is assumed that the time to transmit 1 packet using transmission path 2-1 is t, reception node 1-2 can receive the packets of sequence numbers 1 to 6 from the start of packet reception to 4t.

After transmitting packet stream 10-1, transmission node 1-1 receives an acknowledgement (Ack; confirmation response) indicating the reception completion of, e.g., the packet of sequence number 4 from reception node 1-2. In this case, transmission node 1-1 opens the transmit windows of transmission path 2-1 for 3 packets and transmits packet stream 11-1 succeeding packet stream 10-1. Meanwhile, reception node 1-2 transmits the Ack at a given timing under the predetermined rules. The process is the same when reception node 1-2 transmits the Ack in the following description.

In addition, after transmitting packet stream 10-2, transmission node 1-1 receives an Ack indicating the reception completion of, e.g., the packet of sequence number 6 from reception node 1-2. In this case, transmission node 1-1 opens the transmit windows of transmission path 2-2 for 2 packets and transmits packet stream 11-2 succeeding packet stream 10-2.

In the operation example of FIG. 1, reception node 1-2 can receive the packets of sequence numbers 1 to 12 from the start of packet reception to 8t in the normal order without gaps. Accordingly, reception node 1-2 can transmit all the received packets, i.e., the packets of sequence numbers 1 to 12 to, e.g., a downstream node of reception node 1-2.

Next, an explanation will be made on the operation of transmission node 1-1 and reception node 1-2 when bandwidth reduction occurs in the transmission path shown in FIG. 1 with reference to FIG. 2.

Here, an explanation will be made on the operation of transmission node 1-1 and reception node 1-2 when the bandwidth of transmission path 2-1 is reduced by one half at the time point of starting the packet transmission as shown in FIG. 2, i.e., when the bandwidth of transmission path 2-1 becomes equal to the bandwidth of transmission path 2-2 at the same time with or just before the start of packet transmission.

Still referring to FIG. 2, since transmission node 1-1 does not recognize a state change (bandwidth reduction) of transmission path 2-1 at the time point of starting packet transmission, it transmits packet stream 10-1 using transmission path 2-1 and packet stream 10-2 using transmission path 2-2 like transmission node 1-1 shown in FIG. 1.

In the meantime, reception node 1-2 receives packet stream 20-1 at a lower transmission rate than reception node 1-2 shown in FIG. 1 because bandwidth reduction has occurred in transmission path 2-1. Therefore, when transmitting an Ack for the packet received through transmission path 2-1 to transmission node 1-1 at the same timing as the operation example of FIG. 1, reception node 1-2 can transmit the Ack with respect to the packet of sequence number 1.

In this case, since reception node 1-2 receives the packets of sequence numbers 1, 2, 3 and 6 from the start of packet reception to 4t, it can transmit packets of sequence numbers 1 to 3 to a downstream communication node of reception node 1-2.

Moreover, since reception node 1-2 receives the packets of sequence numbers 1 to 6, 9 and 12 from the start of packet reception to 8t, it can transmit packets of sequence numbers 1 to 6 to the downstream node of reception node 1-2.

That is, in the communication system according to the first prior art, as compared with when the bandwidth of transmission path 2-1 is not reduced, when it is reduced by one half at the time point of starting the packet transmission, the transmission rate from reception node 1-2 to the downstream communication node is reduced by one half from the start of packet reception to 8t.

Further, another example of a communication system according to the prior art has been described in Japanese Laid-Open Patent Publication No. 2006-157889. Here, disclosed is a case of packet retransmission when packet loss occurs in a transmission path.

FIG. 3 is a schematic diagram illustrating an operation example of a communication system in which a transmission path is multiplexed according to the second prior art, and FIG. 4 is a schematic diagram illustrating an operation example when packet loss occurs in the transmission path of the communication system shown in FIG. 3.

Like FIGS. 1 and 2 illustrating the first prior art, FIGS. 3 and 4 schematically show an operation example of transmission node 1-1 and reception node 1-2, when a packet group starting from sequence number 1 is transmitted from transmission node 1-1 to reception node 1-2 via transmission paths 2-1 and 2-2. It is assumed that bandwidths and window sizes of transmission path 2-1 and transmission path 2-2 of the second prior art are identical to those of the first prior art shown in FIG. 1.

With relation to the operation example shown in FIG. 1, FIG. 3 further illustrates packet stream 12-1 which transmission node 1-1 transmits through transmission path 2-1 for the third time, and packet stream 22-1 which reception node 1-2 receives through transmission path 2-1 for the third time. It is assumed that no change occurs in the bandwidths or transmission rates of transmission path 2-1 and transmission path 2-2.

When a packet loss does not occur in transmission path 2-1 and transmission path 2-2, as illustrated in FIG. 3, reception node 1-2 can receive packets of sequence numbers 1 to 18 from the start of packet reception to 12t and transmit the packets to a downstream node of reception node 1-2.

As a result, still referring to FIG. 3, it is obvious that the communication system that transmits the packets using both transmission path 2-1 and transmission path 2-2 has 1.5 times higher transmission performance than the communication system that transmits the packets merely using transmission path 2-1.

Here, for example, when the packet of sequence number 3 transmitted first using transmission path 2-2 is lost, transmission node 1-1 receives an Ack indicating reception completion of the packet of sequence number 6 and loss information indicating loss of the packet of sequence number 3 before transmitting packet stream 11-2, thereby detecting loss of the packet of sequence number 3. In this case, transmission node 1-1 superimposes the packet of sequence number 3 on packet stream 11-2 and retransmits the same.

In an operation example of FIG. 4, although reception node 1-2 receives the packets of sequence numbers 1, 2 and 4 to 12 from the start of packet reception to 8t, it can transmit the packets of sequence numbers 1 and 2 to a downstream communication node of reception node 1-2. However, since reception node 1-2 receives the packets of sequence numbers 1 to 14 after 10t from the start of packet reception, it can transmit the packets of sequence numbers 1 to 14 to the downstream communication node of reception node 1-2.

That is, in the operation example of FIG. 4, the communication system has lower transmission performance than the communication system that transmits the packets merely using transmission path 2-1 until 10t after reception node 1-2 starts packet reception. That is, FIG. 4 shows demerits of the multiplexing of an unreliable transmission path.

However, according to the second prior art, reception node 1-2 can receive the packets of sequence numbers 1 to 17 after 12t from the start of packet reception, and thus can transmit the packets of sequence numbers 1 to 17 to the downstream communication node. Therefore, transmission performance is almost the same as when packet loss does not occur.

The foregoing first and second prior arts relate to a method for detecting a state change when it occurs in a transmission path, and reflecting the state change in the packet scheduling.

Accordingly, when the state change actually occurs in the transmission path, until the state change is detected and reflected in the packet scheduling, transmission node 1-1 continues the packet scheduling based on the prior state of the transmission path.

In the first and second prior arts, it degrades the transmission performance of the multiplexed transmission paths such that the transmission performance of the multiplexed transmission paths is temporarily lower than that of the single transmission path.

SUMMARY

Therefore, an object of the present invention is to provide a communication system which can prevent degradation of the transmission performance even if a state change occurs in multiplexed transmission paths, a communication node, and a packet scheduling method.

According to an aspect of the present invention for achieving the above object, there is provided a communication system in which a transmission path between communication nodes is multiplexed, wherein a communication node that transmits packets includes a path and packet selection unit that decides the order of the packets to be transmitted through each transmission path on the assumption that an event that causes a state change to the transmission path occurs upon the start of packet transmission, such that the packet reception order is not reversed at the communication node that receives the packets.

According to another aspect of the present invention, there is provided a communication node that transmits and receives packets to/from another communication node through multiplexed transmission paths, the communication node including a path and packet selection unit that decides the order of the packets to be transmitted through each transmission path on the assumption that an event that causes a state degradation to the transmission path occurs upon the start of packet transmission, such that the packet reception order is not reversed at the communication node that receives the packets.

According to a further aspect of the present invention, there is provided a packet scheduling method for a communication node that transmits and receives packets to/from another communication node through multiplexed transmission paths, the packet scheduling method comprising deciding the order of the packets to be transmitted through each transmission path on the assumption that an event that causes a state degradation to the transmission path occurs upon the start of packet transmission, such that the packet reception order is reversed at a communication node that receives the packets.

EXEMPLARY EMBODIMENT

Hereinafter, the present invention will be described with reference to the attached drawings.

First Exemplary Embodiment

An explanation is made on a packet scheduling method when bandwidth reduction occurs in any of the multiplexed transmission paths in a communication system according to a first exemplary embodiment.

Figure 5:
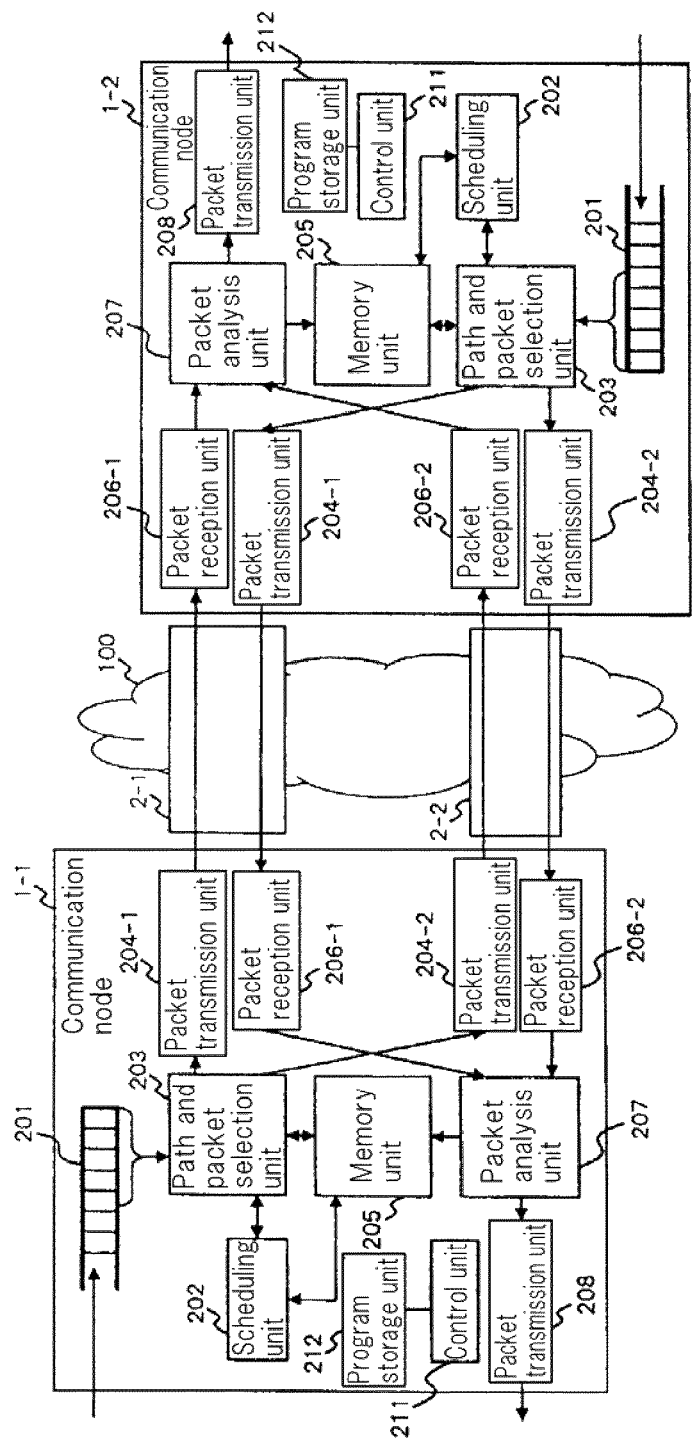
FIG. 5 is a block diagram illustrating the configuration of a communication system according to a first exemplary embodiment.

FIG. 5 is a block diagram illustrating the configuration of the communication system according to the first exemplary embodiment.

As illustrated in FIG. 5, the communication system according to the first exemplary embodiment includes communication node 1-1 and communication node 1-2 that transmits and receives packets, and transmission path 2-1 and transmission path 2-2 used for packet communication between communication node 1-1 and communication node 1-2. Transmission path 2-1 and transmission path 2-2 are provided between communication node 1-1 and communication node 1-2 using conventional communication network 100. In addition, communication node 1-1 and communication node 1-2 have the same structure.

Each of communication node 1-1 and communication node 1-2 includes input packet queue 201, scheduling unit 202, path and packet selection unit 203, packet transmission unit 204-1, packet transmission unit 204-2, memory unit 205, packet reception unit 206-1, packet reception unit 206-2, packet analysis unit 207, packet transfer unit 208, control unit 211, and program storage unit 212.

Program storage unit 212 stores a program which allows a computer (control unit 211) to execute a process for realizing the packet scheduling method according to the present invention that will be discussed later and a well-known process for performing packet communication.

Control unit 211 reads the program from program storage unit 212 and controls the operation of input packet queue 201, scheduling unit 202, path and packet selection unit 203, packet transmission unit 204-1, packet transmission unit 204-2, memory unit 205, packet reception unit 206-1, packet reception unit 206-2, packet analysis unit 207 and packet transfer unit 208 according to the read program.

Input packet queue 201 accumulates packets transmitted from a communication node (not shown).

Path and packet selection unit 203 extracts one or plural transmission packets from input packet queue 201 and creates packet streams (packet streams 10-1, 10-2, 11-1, 11-2, etc. discussed later). In addition, path and packet selection unit 203 selects a transmission path (transmission path 2-1 or transmission path 2-2 in the example of FIG. 5) for use in transmitting the packet streams and outputs the created packet streams to the packet transmission unit (packet transmission unit 204-1 or packet transmission unit 204-2) corresponding to the selected transmission path.

Packet transmission unit 204-1 or 204-2 transmits the packet streams received from path and packet selection unit 203 to the communication node (communication node 1-2 or communication node 1-1) using the corresponding transmission path.

Packet reception unit 206-1 or 206-2 receives the transmitted packets via transmission path 2-1 or 2-2 and outputs the packets to packet analysis unit 207.

Packet analysis unit 207 extracts information on the transmission path used for packet transmission from the received packets and stores the information in memory unit 205 with the packet reception time. In addition, packet analysis unit 207 outputs, to packet transfer unit 208, the packets which can be transferred to a downstream communication node of communication node 1-1 or 1-2 among the packets received from packet reception units 206-1 and 206-2.

Packet transfer unit 208 receives the packets from packet analysis unit 207 and transfers the packets to the downstream communication node of communication node 1-1 or 1-2.

Meanwhile, although FIG. 5 illustrates the configuration example of the communication system in which communication node 1-1 and communication node 1-2 transmit and receive the packets through two transmission paths 2-1 and 2-2, the present invention is applicable to a communication system in which communication node 1-1 and communication node 1-2 transmit and receive packets through three or more transmission paths.

Next, the operation of the communication system according to the first embodiment will be described with reference to the attached drawings.

FIGS. 6 to 9 are schematic diagrams illustrating an operation example of the communication system according to the first exemplary embodiment.

Meanwhile, although communication node 1-1 is a transmission node and communication node 1-2 is a reception node in FIGS. 6 to 9, the operation is the same when communication node 1-1 is a reception node and communication node 1-2 is a transmission node.

Figure 6:
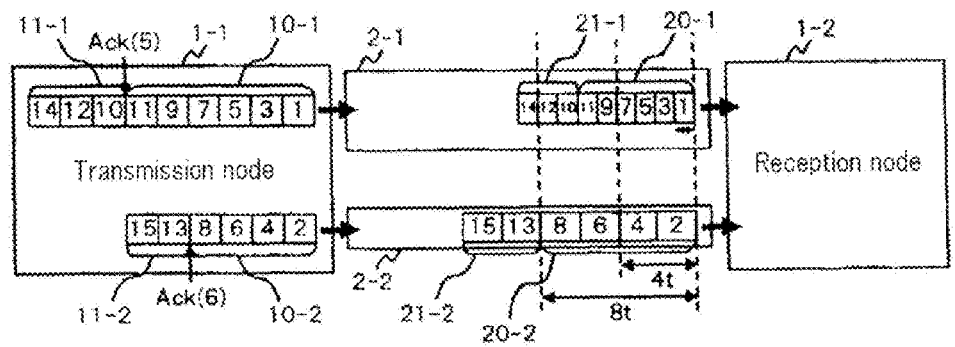
FIG. 6 is a schematic diagram illustrating an operation example of the communication system according to the first exemplary embodiment.
Figure 7:
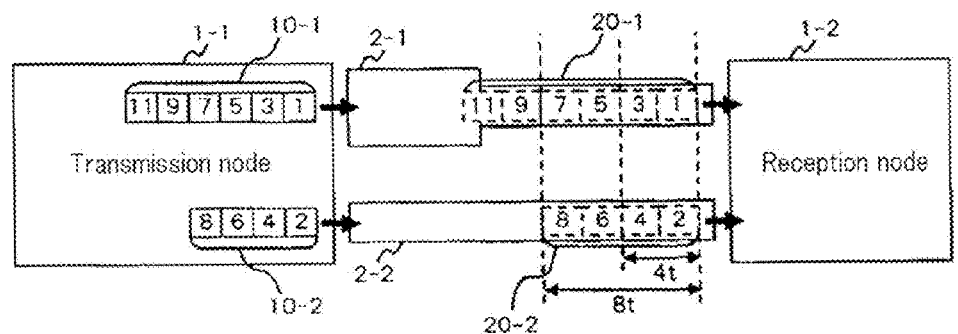
FIG. 7 is a schematic diagram illustrating the operation example of the communication system according to the first exemplary embodiment.

FIGS. 6 to 7 schematically show an operation example of transmission node 1-1 and reception node 1-2, when a packet group starting from sequence number 1 is transmitted from transmission node 1-1 to reception node 1-2 via transmission paths 2-1 and 2-2.

In this exemplary embodiment, it is assumed that transmission path 2-1 is changed in two states, having a bandwidth twice as wide as the bandwidth of transmission path 2-2 in one state and the same bandwidth as the bandwidth of transmission path 2-2 in the other state. Such state changes occur in a given time.

Transmission path 2-1 experiencing such state changes may be a transmission path including a circuit with a bandwidth that is not continuously changed according to the communication environment or the traffic condition, as in the case of a cellular circuit. Each state of transmission path 2-1 is decided based on general features given according to the kind of a circuit included in the transmission path or statistical monitoring results of each state of the transmission path without being limited by the condition of the communication environment or by the traffic condition.

Here, it is assumed that transmission path 2-1 has a wide bandwidth, i.e., a bandwidth twice as wide as that of transmission path 2-2 at the initial state.

Transmission node 1-1 of this exemplary embodiment decides the packet transmission order on the assumption that an event that reduces the bandwidth by one half occurs in transmission path 2-1 of the initial state at the same time that packet transmission is started.

That is, transmission node 1-1 allocates the packets to packet stream 10-1 to be transmitted through transmission path 2-1 and packet stream 10-2 to be transmitted through transmission path 2-2 with alternated sequence numbers on the assumption that the bandwidth of transmission path 2-1 becomes equal to the bandwidth of transmission path 2-2 upon the start of packet transmission, such that the packet reception order is not reversed at reception node 1-2. Like the prior art of FIG. 1, the window size of transmission path 2-1 is larger than that of transmission path 2-2. Therefore, the packet number of packet stream 10-1 is larger than that of packet stream 10-2.

The packet streams which transmission node 1-1 expects reception node 1-2 to receive at the time point of transmitting packet streams 10-1 and 10-2 are packet stream 20-1 and packet stream 20-2 shown in FIG. 7.

Here, when the event that reduces the bandwidth by one half does not occur in transmission path 2-1, the packet streams received at reception node 1-2 are packet stream 20-1 and packet stream 20-2 shown in FIG. 6.

After transmitting packet stream 10-1; transmission node 1-1 receives an Ack indicating the reception completion of, e.g., the packet of sequence number 5 from reception node 1-2. In this case, transmission node 1-1 may determine that bandwidth reduction does not occur in transmission path 2-1 at this time point. Meanwhile, transmission node 1-1 may determine that bandwidth reduction has not occurred in transmission path 2-1 at the time point of receiving an Ack that indicates the reception completion of the succeeding packet after the Ack that indicates the reception completion of the packet of sequence number 5.

When determining that bandwidth reduction has not occurred in transmission path 2-1, transmission node 1-1 can be aware that reception node 1-2 has received the packets of sequence numbers 1 to 9 and 11 contained in previously-transmitted packet stream 10-1 through a bandwidth that is twice as wide as that of transmission path 2-2.

Although transmission node 1-1 of this exemplary embodiment determines that it could transmit packet stream 10-1 without bandwidth reduction of transmission path 2-1, it further decides the packet transmission order on the assumption that the event that causes the bandwidth reduction occurs in transmission path 2-1 directly after reception node 1-2 receives the packet of sequence number 11 transmitted just before the determination, i.e., transmitted at the last part of packet stream 10-1.

Figure 8:
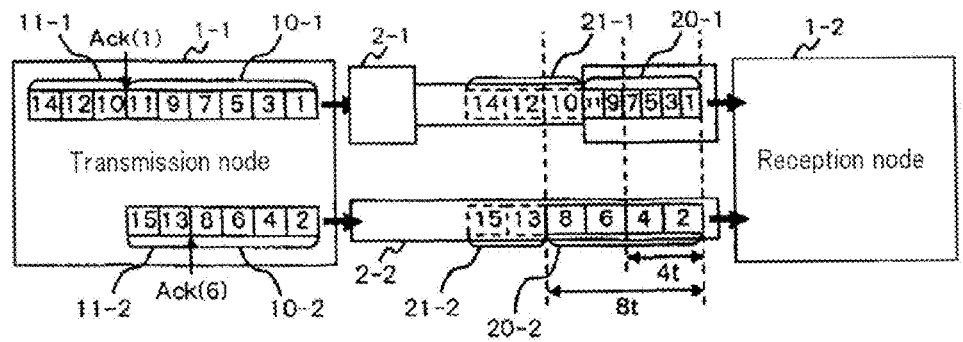
FIG. 8 is a schematic diagram illustrating the operation example of the communication system according to the first exemplary embodiment.

Here, when transmission node 1-1 transmits packet streams 11-1 and 11-2, and packet streams 11-1 and 11-2 succeeding packet streams 10-1 and 10-2, it expects reception node 1-2 to receive packet streams 21-1 and 21-2 as shown in FIG. 8.

Generally, transmission node 1-1 disposes the packet of sequence number 13 after the packet of sequence number 11. However, in this exemplary embodiment, as described above, since transmission node 1-1 assumes that the event that causes the bandwidth reduction occurs in transmission path 2-1 directly after reception node 1-2 receives the packet of sequence number 11, it disposes the packet of sequence number 10 after the packet of sequence number 11 as shown in FIG. 8.

That is, transmission node 1-1 disposes the packets in the order of sequence numbers 10, 12 and 14 in packet stream 11-1 to be transmitted via transmission path 2-1 and disposes the packets in the order of sequence numbers 13 and 15 in packet stream 11-2 to be transmitted via transmission path 2-2.

When transmission node 1-1 disposes the packet of sequence number 13 after the packet of sequence number 11, reception node 1-2 can transfer the packets of sequence numbers 1 to 9 to the downstream communication node of reception node 1-2 after 8t from the start of packet reception.

In the meantime, as illustrated in FIG. 8, when transmission node 1-1 disposes the packet of sequence number 10 after the packet of sequence number 11, reception node 1-2 can transfer the packets of sequence numbers 1 to 11 to the downstream communication node of reception node 1-2 after 8t from the start of packet reception.

When the event that causes bandwidth reduction does not actually occur in transmission path 2-1 directly after reception node 1-2 receives the packet of sequence number 11, reception node 1-2 receives packet streams 21-1 and 21-2 shown in FIG. 6. In this case, since reception node 1-2 receives the packets of sequence numbers 1 to 5 and 7 from the start of packet reception to 4t, it can transfer the packets of sequence numbers 1 to 5 to the downstream communication node of reception node 1-2. Moreover, since reception node 1-2 receives the packets of sequence numbers I to 12 after 8t from the start of packet reception, it can transfer the packets of sequence numbers 1 to 12 to the downstream communication node of reception node 1-2.

Next, an explanation will be made on the operation when the event that causes bandwidth reduction actually occurs in transmission path 2-1.

When transmission node 1-1 transmits packet streams 10-1 and 10-2, as the bandwidth of transmission path 2-1 is reduced, reception node 1-2 receives packet stream 20-1 shown in FIG. 7 through transmission path 2-1 and receives packet stream 20-2 shown in FIG. 7 through transmission path 2-2.

Here, after transmitting packet stream 10-1, transmission node 1-1 receives an Ack indicating the reception completion of the packet of sequence number 1 from reception node 1-2 after 3t from the start of packet reception. Transmission node 1-1 that receives the Ack of the packet of sequence number 1 opens one window, and thus can transmit only one succeeding packet.

Meanwhile, since the event that causes the bandwidth change does not occur in transmission path 2-2, transmission node 1-1 can receive an Ack that indicates the reception completion of the packet of sequence number 6 and superimposes two packets on packet stream 11-2 to be transmitted next.

This exemplary embodiment does not suppose a state where the bandwidth of transmission path 2-1 is reduced by more than half. Therefore, transmission node 1-1 decides the sequence numbers of the respective packets allocated to packet streams 11-1 and 11-2 on the assumption that transmission path 2-1 maintains the same bandwidth as transmission path 2-2, such that the packet reception order is not reversed at reception node 1-2.

Figure 9:
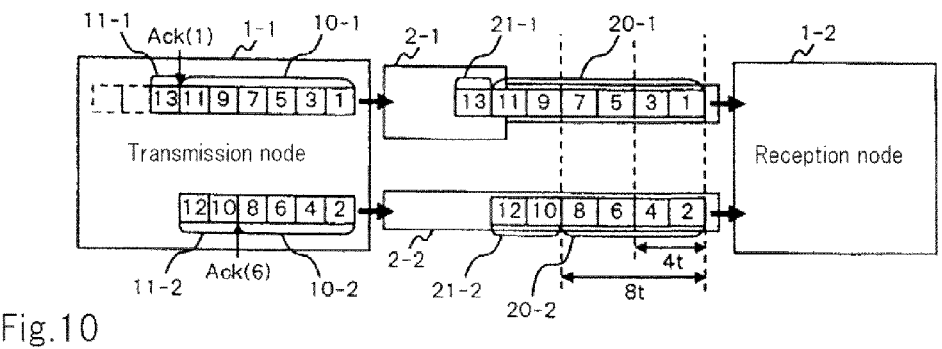
FIG. 9 is a schematic diagram illustrating the operation example of the communication system according to the first exemplary embodiment.

As a result, as illustrated in FIG. 9, reception node 1-2 receives packet stream 20-1 that arrives in the order of the packets of sequence numbers 1, 3, 5, 7, 9 and 11, packet stream 20-2 that arrives in the order of the packets of sequence numbers 2, 4, 6, and 8, and packet stream 20-2 that arrives in the order of the packets of sequence numbers 10 and 12.

In this case, since reception node 1-2 receives the packets of sequence numbers 1 to 4 after 4t from the start of packet reception, it can transfer the packets of sequence numbers 1 to 4 to the downstream communication node of reception node 1-2. In addition, since reception node 1-2 receives the packets of sequence numbers 1 to 8 after 8t from the start of packet reception, it can transfer the packets of sequence numbers 1 to 8 to the downstream communication node of reception node 1-2.

Figure 10:
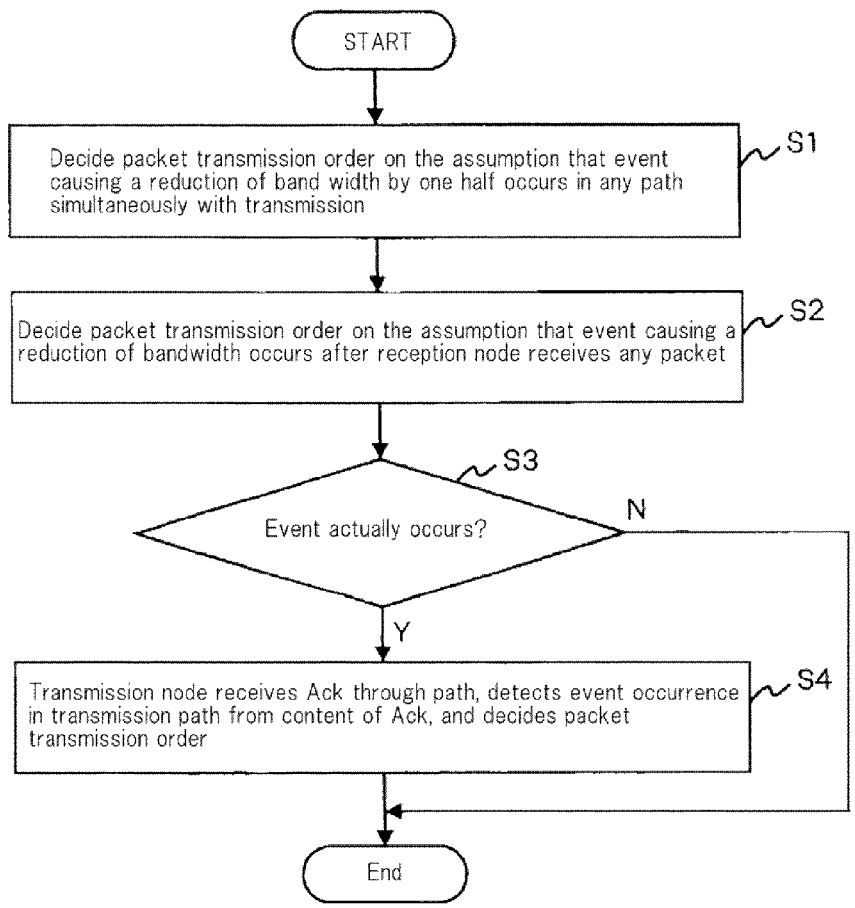
FIG. 10 is a flowchart illustrating sequential steps of a packet scheduling method according to the first exemplary embodiment.

FIG. 10 is a flowchart illustrating sequential steps of a packet scheduling method according to the first exemplary embodiment.

Control unit 21 provided in the communication node controls path and packet selection unit 203 to execute the process shown in FIG. 10. Moreover, program storage unit 212 stores a program which allows control unit 21 to execute the process shown in FIG. 10, and control unit 211 reads this program from program storage unit 212 and controls the operation of path and packet selection unit 203 according to the read program.

As illustrated in FIG. 10, path and packet selection unit 203 decides the order of packets to be transmitted using a plurality of transmission paths on the assumption that, e.g., an event that reduces a bandwidth by one half occurs in any path (the transmission path expected to experience the bandwidth reduction) at the same time that transmission occurs (step S1).

Transmission packet streams acquired at step S1 are, e.g., transmission packet streams 10-1 and 10-2 shown in FIG. 6.

Next, when path and packet selection unit 203 determines that the event has not actually occurred in the transmission path that is expected to experience the bandwidth reduction, it decides the order of packets to be transmitted through each transmission path on the assumption that the event that causes the bandwidth reduction occurs directly after reception node 1-2 receives any packet (the packet transmitted directly before the determination) (step S2).

Transmission packet streams acquired at step S2 are, e.g., transmission packet streams 11-1 and 11-2 shown in FIG. 6.

Next, path and packet selection unit 203 determines whether the event that causes the bandwidth reduction has actually occurred in the transmission path that is expected to experience the bandwidth reduction based on the sequence number of a packet contained in an Ack transmitted from reception node 1-2, etc. (step S3).

When the event that causes the bandwidth reduction has actually occurred, path and packet selection unit 203 decides the order of the packets to be transmitted through each transmission path based on a reduced bandwidth value (step S4).

Transmission packet streams acquired at step S4 are, e.g., transmission packet streams 1'-1 and 11-2 shown in FIG. 9. When the event that causes bandwidth reduction has not occurred, the process is ended.

In the communication system of this exemplary embodiment, when the event that causes bandwidth reduction does not occur in transmission path 2-1, reception node 1-2 can transfer the packets of sequence numbers 1 to 5 to the downstream communication node of reception node 1-2 after 4t from the start of packet reception and transfer the packets of sequence numbers 1 to 12 to the downstream communication node of reception node 1-2 after 8t from the start of packet reception (refer to FIG. 6).

In addition, when the event that causes bandwidth reduction actually occurs in transmission path 2-1, reception node 1-2 can transfer the packets of sequence numbers 1 to 4 to the downstream communication node of reception node 1-2 after 4t from the start of packet reception and transfer the packets of sequence numbers 1 to 8 to the downstream communication node of reception node 1-2 after 8t from the start of packet reception (refer to FIG. 9).

Figure 1:
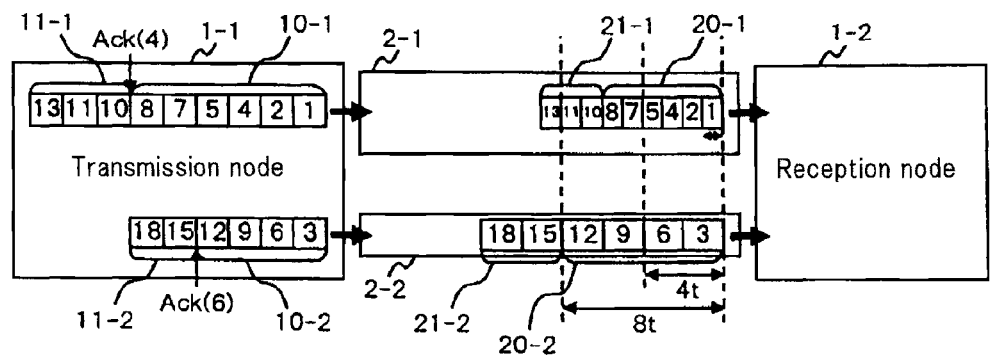
FIG. 1 is a schematic diagram illustrating an operation example of a communication system in which a transmission path is multiplexed according to the first prior art.

Meanwhile, in the communication system according to the first prior art shown in FIG. 1, when the event that causes bandwidth reduction does not occur in transmission path 2-1, reception node 1-2 can transfer the packets of sequence numbers 1 to 6 to the downstream communication node of reception node 1-2 after 4t from the start of packet reception and transfer the packets of sequence numbers 1 to 12 to the downstream communication node of reception node 1-2 after 8t from the start of packet reception.

Figure 2:
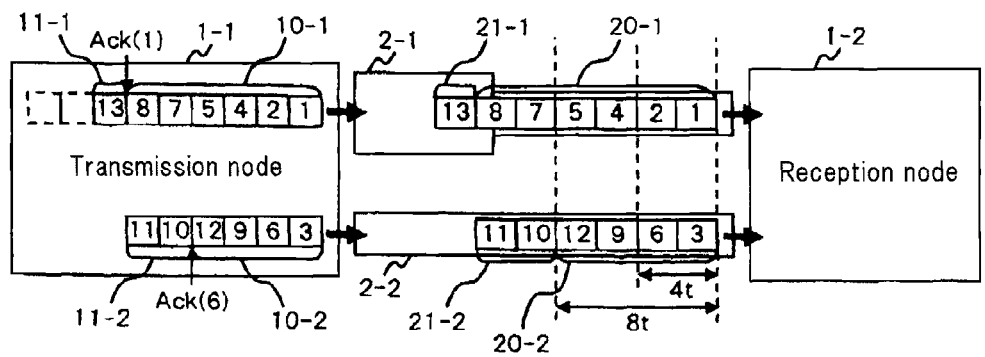
FIG. 2 is a schematic diagram illustrating an operation example when bandwidth reduction occurs in the transmission path of the communication system shown in FIG. 1.

Moreover, when the event that causes bandwidth reduction actually occurs in transmission path 2-1, reception node 1-2 can transfer the packets of sequence numbers 1 to 3 to the downstream communication node of reception node 1-2 after 4t from the start of packet reception and transfer the packets of sequence numbers 1 to 6 to the downstream communication node of reception node 1-2 after 8t from the start of packet reception (refer to FIG. 2).

Therefore, when the event that causes bandwidth reduction does not occur in transmission path 2-1, the communication system according to the first exemplary embodiment has a little lower transmission performance than the communication system according to the first prior art from the start of packet reception to 4t.

However, when the event that causes bandwidth reduction actually occurs in transmission path 2-1, the communication system according to the first exemplary embodiment has higher transmission performance than the communication system according to the first prior art from the start of packet reception to 4t and 8t.

Accordingly, when the state change occurs in the transmission path, the communication system according to the first exemplary embodiment has a higher transmission rate than the communication system according to the first prior art. Moreover, when the state change does not occur in the transmission path, the communication system according to the first exemplary embodiment has a transmission rate almost equal to the transmission rate of the communication system according to the first prior art.

Meanwhile, in this exemplary embodiment, as described above, when bandwidth reduction does not occur in the transmission path, the communication system according to the first exemplary embodiment has a little lower transmission performance than the communication system according to the first prior art. It is thus preferable to determine the application of the packet scheduling method of this exemplary embodiment taking into consideration transmission performance in the occurrence of the event and transmission performance in the non-occurrence of the event.

Further, in the exemplary embodiment described above, packet scheduling is performed on the assumption that the state change actually occurs in the transmission path, e.g., the bandwidth of the transmission path is reduced by one half. However, packet scheduling is not necessarily performed based on the actual state, and may be performed using a different value from the actual state taking into consideration design margin, measurement error, etc. For example, even if the bandwidth of the transmission path is reduced by one half during the occurrence of the event, packet scheduling may be performed on the assumption that the bandwidth of the transmission path is reduced by ¼ or ¾.

Second Exemplary Embodiment

An explanation is made on a packet scheduling method when a packet loss occurs in any of the multiplexed transmission paths in a communication system according to a second exemplary embodiment. Meanwhile, the configuration of the communication system is identical to that of the communication system according to the first exemplary embodiment shown in FIG. 5, and thus detailed explanations thereof are omitted.

Transmission node 1-1 of this exemplary embodiment decides packets to be transmitted at the time point of the packet retransmission on the assumption that the first transmitted packet is lost, such that the order of the packets received at reception node 1-2 through transmission path 2-1 and transmission path 2-2 is not reversed.

Figure 11:
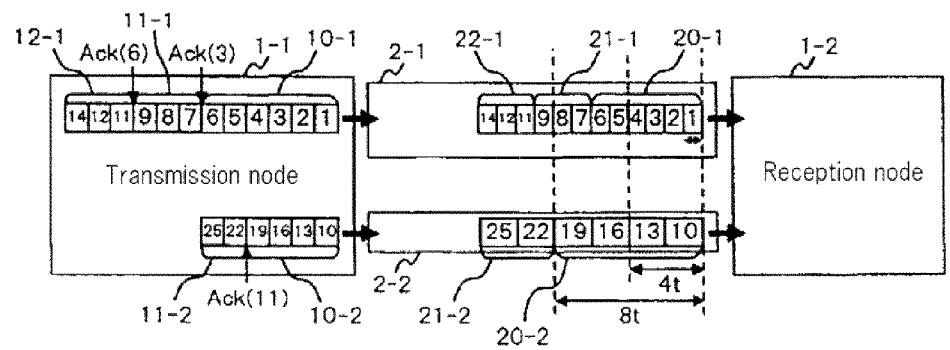
FIG. 11 is a schematic diagram illustrating an operation example of a communication system according to a second exemplary embodiment.
Figure 12:
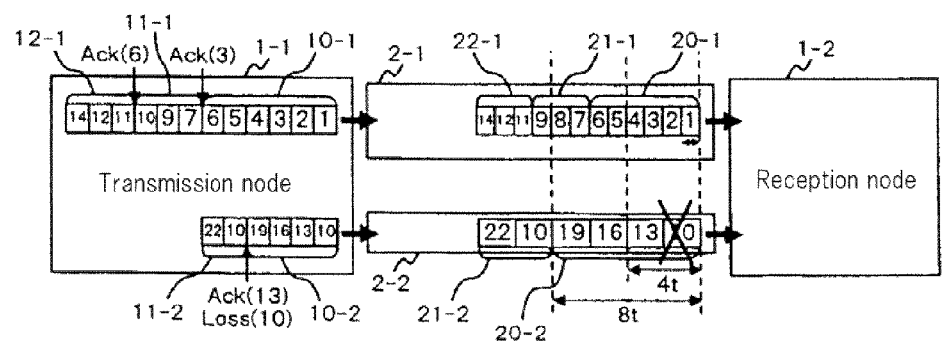
FIG. 12 is a schematic diagram illustrating the operation example of the communication system according to the second exemplary embodiment.
Figure 13:
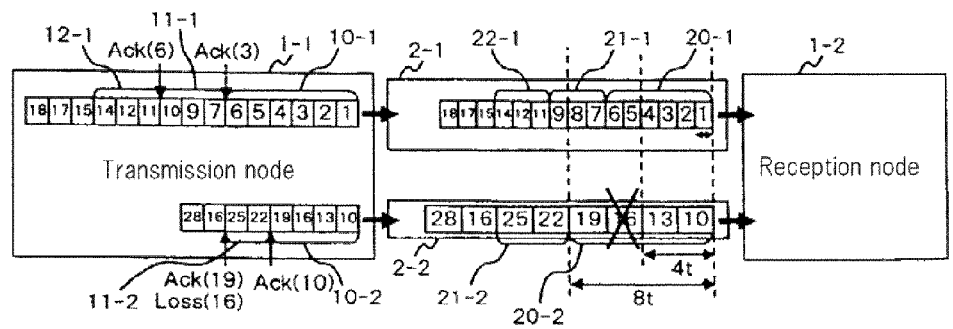
FIG. 13 is a schematic diagram illustrating the operation example of the communication system according to the second exemplary embodiment.

FIGS. 11 to 13 are schematic diagrams illustrating an operation example of the communication system according to the second exemplary embodiment.

Meanwhile, although communication node 1-1 is a transmission node and communication node 1-2 is a reception node in FIGS. 11 to 13, the operation is the same when communication node 1-1 is a reception node and communication node 1-2 is a transmission node.

FIGS. 11 to 13 schematically show an operation example of transmission node 1-1 and reception node 1-2, when a packet group starting from sequence number 1 is transmitted from transmission node 1-1 to reception node 1-2 via transmission paths 2-1 and 2-2.

In this exemplary embodiment, it is assumed that transmission path 2-1 has a bandwidth twice as wide as the bandwidth of transmission path 2-2 and that a packet loss occurs in transmission path 2-2 at a certain ratio.

As illustrated in FIG. 11, transmission node 1-1 of this exemplary embodiment transmits two packets of sequence numbers 10 and 13 for the first time using transmission path 2-2.

Here, reception node 1-2 may receive the packet of sequence number 10 from the start of packet reception to 10t and receive the packet of sequence number 13 from the start of packet reception to 12t.

In this case, reception node 1-2 can transfer the packets of sequence numbers 1 to 14 to a downstream communication node of reception node 1-2 after 12t from the start of packet reception.

According to the second prior art described above, as illustrated in FIG. 3, reception node 1-2 can transfer the packets of sequence numbers 1 to 18 to the downstream communication node of reception node 1-2 after 12t from the start of packet reception.

Figure 3:
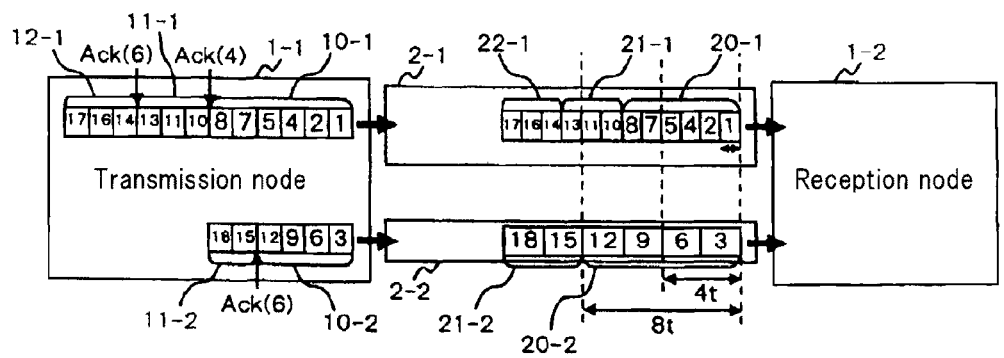
FIG. 3 is a schematic diagram illustrating an operation example of a communication system in which a transmission path is multiplexed according to the second prior art.
Figure 4:
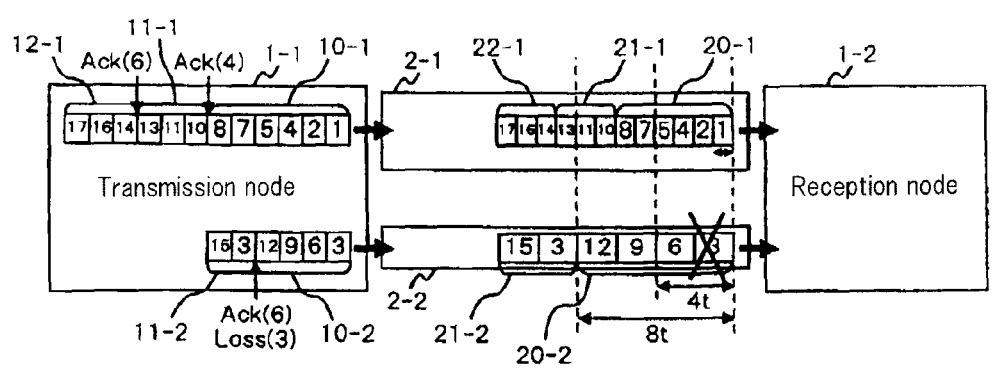
FIG. 4 is a schematic diagram illustrating an operation example when packet loss occurs in the transmission path of the communication system shown in FIG. 3.

Therefore, when an event causing a packet loss does not occur in transmission path 2-2, the communication system according to the second exemplary embodiment has a little lower transmission performance than the communication system according to the second prior art shown in FIG. 3 from the start of packet reception to 12t. However, when transmission node 1-1 transmits the packets using a single transmission path, since reception node 1-2 can transfer the packets of sequence numbers 1 to 12 to the downstream communication node of reception node 1-2 after 12t from the start of packet reception, the communication system according to the second exemplary embodiment shown in FIG. 11 can obtain the effect by multiplexing of the transmission path.

In the meantime, when the packet of sequence number 10 is actually lost, as illustrated in FIG. 12, after transmitting packet stream 10-2, transmission node 1-1 receives, from reception node 1-2, an Ack indicating reception completion of the packet of sequence number 13 and loss information indicating the loss of the packet of sequence number 10 after 4t from the start of packet reception.

When detecting the loss of the packet of sequence number 10 according to loss information, transmission node 1-1 superimposes the packet of sequence number 10 on packet stream 11-1 that succeeds packet stream 10-1 transmitted through transmission path 2-1 and transmits packet stream 11-1.

In this situation, as in the operation example shown in FIG. 11, reception node 1-2 can transfer the packets of sequence numbers 1 to 14 to the downstream communication node of reception node 1-2 after 12t from the start of packet reception. That is, when the event that causes the packet loss occurs in transmission path 2-2, as compared with a communication system that transmits packets using a single transmission path, the communication system according to the second exemplary embodiment can prevent degradation of transmission performance.

Next, FIG. 13 illustrates an operation example when the packet of sequence number 16 is lost.

As illustrated in FIG. 13, after transmitting packet stream 11-2, transmission node 1-1 receives, from reception node 1-2, an Ack indicating reception completion of the packet of sequence number 19 and loss information indicating loss of the packet of sequence number 16 after 6t from the start of packet reception.

When detecting loss of the packet of sequence number 16 according to the loss information, transmission node 1-1 superimposes the packet of sequence number 16 on a packet stream that succeeds packet stream 11-2 transmitted through transmission path 2-2 and transmits the packet stream.

In this situation, reception node 1-2 can receive the packet of sequence number 16 after 16t from the start of packet reception (after 10t from the reception time without any packet loss) and transfer the packets of sequence numbers 1 to 16 to the downstream communication node of reception node 1-2. That is, it is recognized that the communication system according to the second exemplary embodiment prevents the transmission performance from being degraded due to multiplexing at any time point until 16t after reception node 1-2 starts packet reception.

Figure 14:
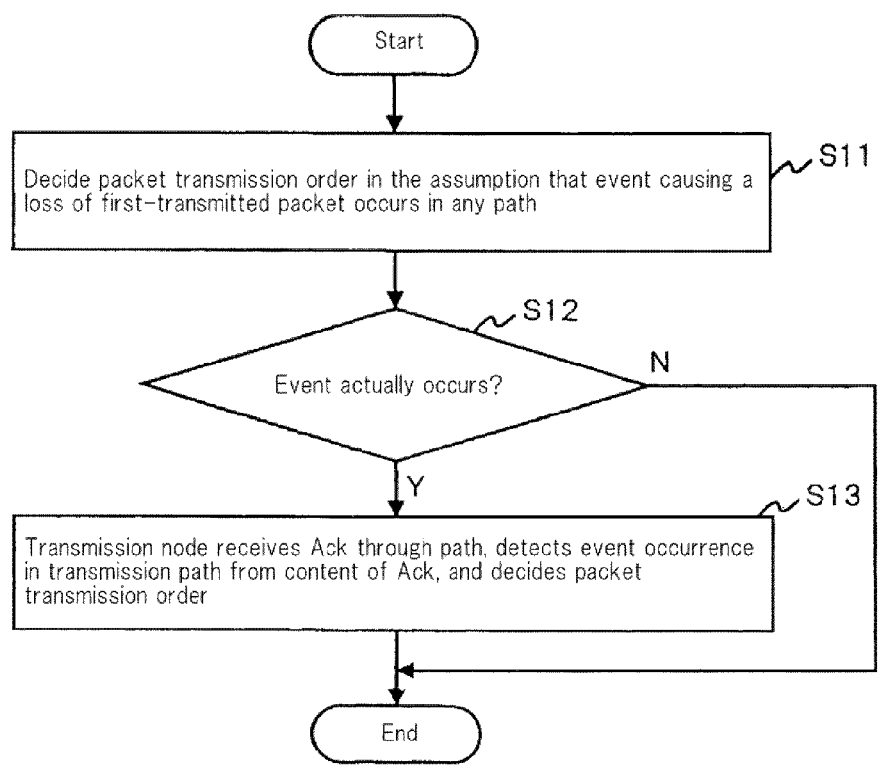
FIG. 14 is a flowchart illustrating sequential steps of a packet scheduling method according to the second exemplary embodiment.

FIG. 14 is a flowchart illustrating sequential steps of a packet scheduling method according to the second exemplary embodiment.

Control unit 21 provided in the communication node controls path and packet selection unit 203 to execute the process shown in FIG. 14. Moreover, program storage unit 212 stores a program which allows control unit 21 to execute the process shown in FIG. 14, and control unit 211 reads this program from program storage unit 212 and controls the operation of path and packet selection unit 203 according to the read program.

As illustrated in FIG. 14, path and packet selection unit 203 decides the order of packets to be transmitted using a plurality of transmission paths on the assumption that an event that causes a loss of a first transmitted packet occurs in any path (the transmission path that is expected to experience the packet loss) (step S11).

Transmission packet streams acquired at step S11 are, e.g., transmission packet streams 10-1 to 12-1 and 10-2 to 11-2 shown in FIG. 11.

Next, path and packet selection unit 203 determines whether the event that causes the packet loss has actually occurred in the transmission path that is expected to experience the packet loss based on loss information transmitted from reception node 1-2, etc. (step S12).

When the event that causes the packet loss has actually occurred, path and packet selection unit 203 decides the order of the packets to be transmitted through each transmission path based on the sequence number of the lost packet (step S13).

Transmission packet streams acquired at step S13 are, e.g., transmission packet streams 10-1 to 12-1 and 10-2 to 11-2 shown in FIG. 12. When the event that causes the packet loss has not occurred, the process is ended.

As compared with the communication system that transmits the packets using the single transmission path, the communication system of this exemplary embodiment prevents degradation of transmission performance in spite of the occurrence of the packet loss.

This application is based upon and claims the benefit of priority from Japanese patent application No. 2007-149850, filed on Jun. 6, 2007, the disclosure of which is incorporated herein in its entirety by reference.

The invention claimed is:

1. A communication system in which a transmission path between communication nodes is multiplexed, wherein a communication node that transmits packets comprises
a path and packet selection unit that decides an order of said packets to be transmitted through each transmission path on an assumption that an event that causes a state change to said transmission path occurs upon a start of packet transmission, such that a packet reception order is not reversed at the communication node that receives said packets,
wherein said event causes a bandwidth reduction to said transmission path, and
when determining that said event has not actually occurred in said transmission path, said path and packet selection unit decides the order of the packets to be transmitted through each transmission path on an assumption that said event occurs directly after the communication node that receives said packets receives the packet transmitted directly before the determination is made.

2. The communication system according to claim 1, wherein said path and packet selection unit determines whether or not said event has actually occurred in a defined transmission path according to a confirmation response transmitted through the transmission path from the communication node receiving said packets, and decides the order of the packets to be transmitted through each transmission path.

3. The communication system according to claim 1, wherein said event causes a loss of the packet transmitted through said transmission path.

4. A communication node transmitting and receiving packets to/from another communication node through multiplexed transmission paths, the communication node comprising
a path and packet selection unit deciding an order of the packets to be transmitted through each transmission path on an assumption that an event causing a state degradation to said transmission path occurs upon a start of packet transmission, such that a packet reception order is not reversed at a communication node receiving said packets,
wherein said event causes bandwidth reduction of said transmission path, and
when determining that said event has not actually occurred in said transmission path, said path and packet selection unit decides the order of the packets to be transmitted through each transmission path on an assumption that said event occurs directly after the communication node that receives said packets receives the packet transmitted directly before the determination is made.

5. The communication node according to claim 4, wherein said path and packet selection unit determines whether or not said event has actually occurred in a defined transmission path according to a confirmation response transmitted through the transmission path from the communication node receiving said packets, and decides the order of the packets to be transmitted through each transmission path.

6. The communication node according to claim 4, wherein said event causes a loss of the packet transmitted through said transmission path.

7. A packet scheduling method for a communication node transmitting and receiving packets to/from another communication node through multiplexed transmission paths, said packet scheduling method comprising
deciding an order of the packets to be transmitted through each transmission path on an assumption that an event that causes a state degradation to said transmission path occurs upon a start of packet transmission, such that a packet reception order is not reversed at a communication node receiving said packets,
wherein said event causes bandwidth reduction of said transmission path, and
when it is determined that said event has not actually occurred in said transmission path, deciding the order of the packets to be transmitted through each transmission path on an assumption that said event occurs directly after the communication node that receives said packets receives the packet transmitted directly before the determination is made.

8. The packet scheduling method according to claim 7, comprising determining whether or not said event has actually occurred in a defined transmission path according to a confirmation response transmitted through the transmission path from the communication node receiving said packets, and deciding the order of the packets to be transmitted through each transmission path.

9. The packet scheduling method according to claim 7, wherein said event causes a loss of the packet transmitted through said transmission path.

* * * * *